(No Model.)
C. R. JONES.
CULINARY UTENSIL.
No. 588,440. Patented Aug. 17, 1897.
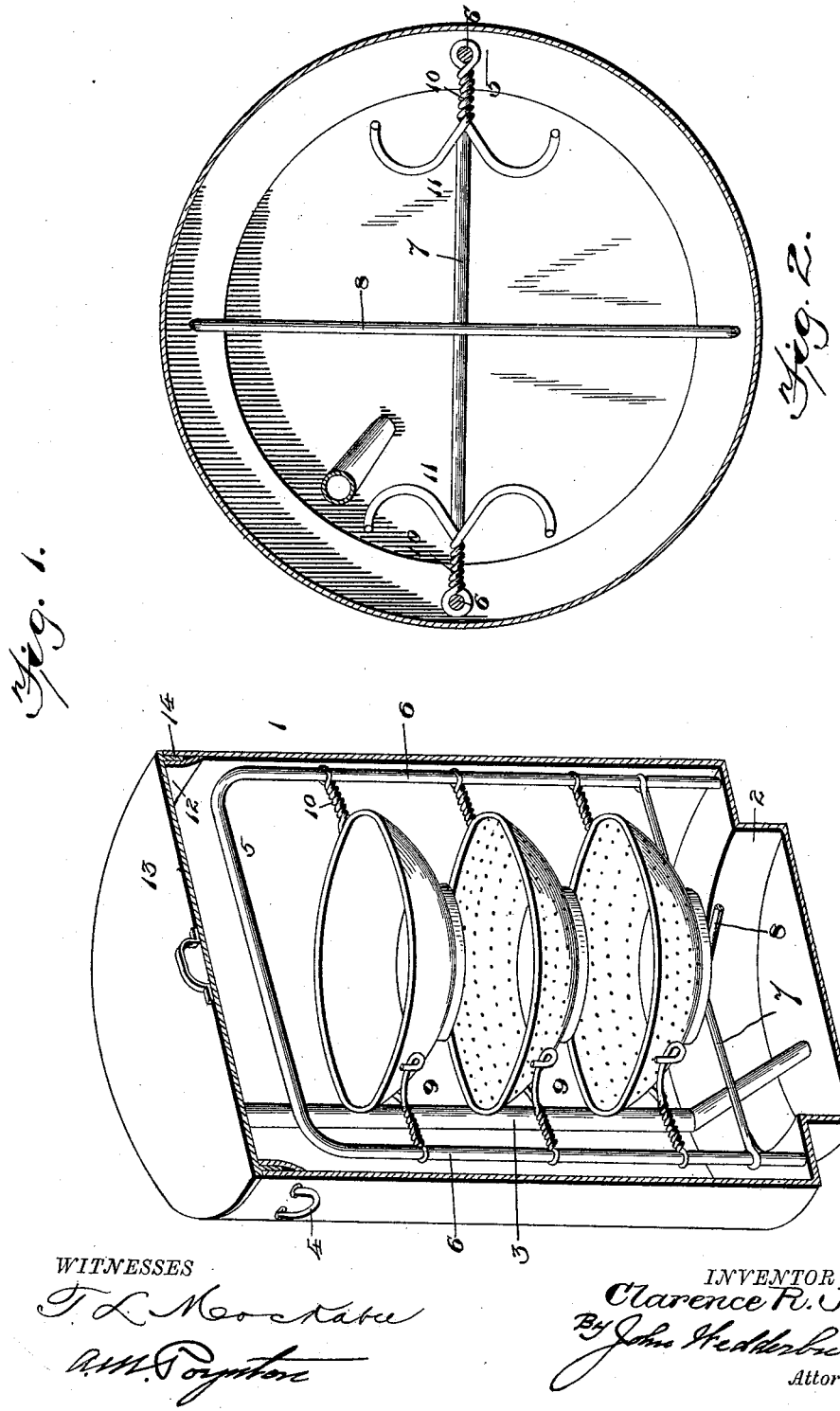

UNITED STATES PATENT OFFICE.

CLARENCE R. JONES, OF ALTON BAY, NEW HAMPSHIRE.

CULINARY UTENSIL.

SPECIFICATION forming part of Letters Patent No. 588,440, dated August 17, 1897.

Application filed February 3, 1897. Serial No. 621,755. (No model.)

*To all whom it may concern:*

Be it known that I, CLARENCE R. JONES, a citizen of the United States, residing at Alton Bay, in the county of Belknap and State of New Hampshire, have invented certain new and useful Improvements in Culinary Utensils; and I do hereby declare the following to be a full, clear, and exact description of the invention, such as will enable others skilled in the art to which it appertains to make and use the same.

My invention relates to certain new and useful improvements in culinary utensils, and particularly to that class known as "steam-cookers;" and my object is to provide a cooker which may readily admit of the removal of the dishes from the kettle and their ready return thereto, which shall be capable of accommodating several dishes in order that various articles may be cooked at the same time, and which is so arranged that the lower dish may be as readily examined as the upper dish.

To these ends my invention comprises certain novel features of construction and arrangement of parts whereby these and other advantages are gained in a simple and inexpensive manner, as will be hereinafter fully described, and specifically defined in the appended claims.

In the accompanying drawings, forming part of this specification, Figure 1 represents a central vertical sectional perspective view of a steam-cooker embodying my invention, the dish-carrying device being shown in elevation; and Fig. 2 is a horizontal section of the same.

Similar reference-numerals indicate corresponding parts in both figures of the drawings.

1 represents a kettle which may be made cylindrical in form and of any desired material, having its bottom formed with the usual projecting and reduced central portion 2, adapted to fit the hole of the stove or range.

A pipe 3 is arranged within the kettle 1 and, communicating with the bottom thereof, passes upward to within a short distance of the top, and the purpose of the pipe is to carry off the steam which generates in the kettle during the process of cooking and with it any bad odors which may arise. Suitable handles 4 are arranged upon the upper portion of the kettle, and these may be grasped by the hand when removing the kettle from the stove.

My improved dish-holding device, which is intended for use in connection with the present invention and which I term the "rack," is constructed by bending a piece of stout wire 5 into the form of an arch, and the extremities of the vertical portions 6 thereof rest upon the bottom of the kettle, and thus support the rack in place therein. To give additional strength to the rack, I provide a cross-bar 7 near the lower extremities, to which it is securely fastened, and a similar bar 8 is arranged at right angles thereto, both being securely soldered together at their meeting edges, and the ends of this bar 8 are bent downwardly to form legs, which rest upon the bottom of the kettle, and thus serve to give greater steadiness to the rack.

Upon each of the vertical portions 6 of the rack I provide a series of inwardly-projecting supports 9 for the dishes, three being shown at each side in the present instance, which are securely fastened thereto, and these supports may be formed out of wires 10, the intermediate portion of which surround the vertical portions 6 of the rack, from whence the arms thereof are twisted upon one another for a portion of their length, the terminal portions of said arms being spread apart in opposite directions and turned upwardly, thus forming convenient supports 11 for the dishes, as will be readily understood.

It will thus be seen that my invention provides in a simple and inexpensive manner a steam-cooker which permits of the easy removal of the dishes therefrom and which admits of various dishes being cooked at the same time, and it will also be seen that the rack when removed from the kettle may be placed upon a sink or other convenient place, where it is steadily supported in the manner described and where the various articles being cooked may be readily inspected.

The kettle may be used for any of the ordinary purposes after the rack has been removed therefrom, and the upper inner portion of this kettle is provided with a narrow band 12, the upper edge of which band is level with the upper edge of the kettle, while the lower edge is soldered within. The cover 13 is provided with an annular rim 14, which when in place on the kettle is adapted to fit between the band 12 and the kettle, thus effectually forming a practically steam-tight joint, as clearly shown.

Having thus described my invention, what I claim, and desire to secure by Letters Patent, is as follows:

1. A steam-cooker comprising a kettle having a rack provided with a series of supports for dishes, said supports consisting of wires adapted to engage the said rack, their free ends being spread apart and bent, substantially as described.

2. A steam-cooker comprising a kettle, a rack formed of an arched piece of wire, and a series of dish-holding devices attached to the vertical arms of said rack, said dish-holding devices consisting of wires whose intermediate portions wrap around the vertical portions of the said arched piece, thence twisted one upon another, and their outer portions being spread apart and bent upwardly, substantially as described.

In testimony whereof I have signed this specification in the presence of two subscribing witnesses.

CLARENCE R. JONES.

Witnesses:
CHARLES H. DAVIS,
JOHN L. DAVIS.